May 13, 1930. E. M. SALERNI 1,758,624
APPARATUS FOR REMOVING DUST FROM GASES OR VAPORS
Filed Oct. 31, 1925 2 Sheets-Sheet 1
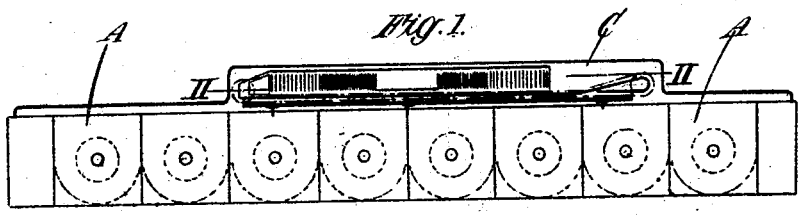
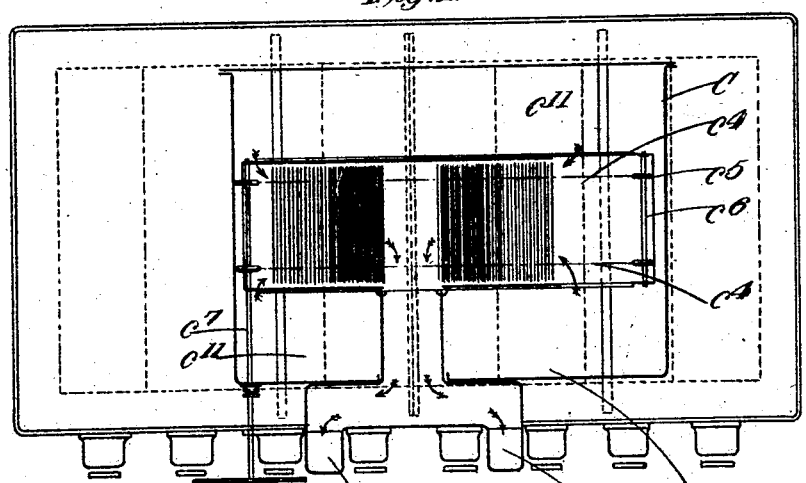
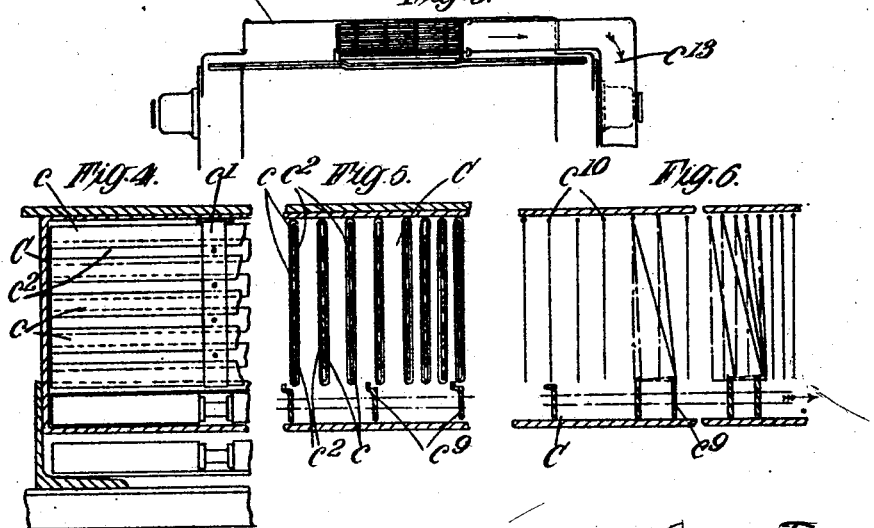

May 13, 1930.  E. M. SALERNI  1,758,624
APPARATUS FOR REMOVING DUST FROM GASES OR VAPORS
Filed Oct. 31, 1925  2 Sheets-Sheet 2

Patented May 13, 1930

1,758,624

UNITED STATES PATENT OFFICE

EDOARDO MICHELE SALERNI, OF PARIS, FRANCE, ASSIGNOR TO E. M. S. INDUSTRIAL PROCESSES LIMITED, OF LONDON, ENGLAND, A CORPORATION OF ENGLAND

APPARATUS FOR REMOVING DUST FROM GASES OR VAPORS

Application filed October 31, 1925, Serial No. 66,052, and in Great Britain November 10, 1924.

This invention relates to apparatus for removing dust from gases or vapors, for example gases which have undergone distillation in a low temperature cooling distillation apparatus.

The object of the present invention is to provide an improved form of dust removing apparatus of the kind in which the dust laden gases or vapors are passed through a chamber provided with a series of depending members or plates.

In order that the said invention may be clearly understood and readily carried into effect, the same will now be described more fully with reference to the accompanying drawing, which shows, by way of example, an apparatus suitable for extracting dust from the vapors yielded up during the low temperature distillation of carbonaceous material in retorts constructed as described in the specification of U. S. Patent 1,541,071 and in which:—

Figure 1 is a longitudinal section;

Figure 2 is a sectional plan view on the line II—II of Figure 1;

Figure 3 is a cross section showing the dust extractor disposed above a set of the aforesaid retorts;

Figures 4, 5 and 6, are detail views showing on an enlarged scale the depending baffle plates forming part of the dust extractor, Figure 4 being a sectional end view, Figure 5 a sectional elevation, and Figure 6 a diagrammatic sectional elevation showing a modified arrangement of depending baffle plates.

Figure 7:
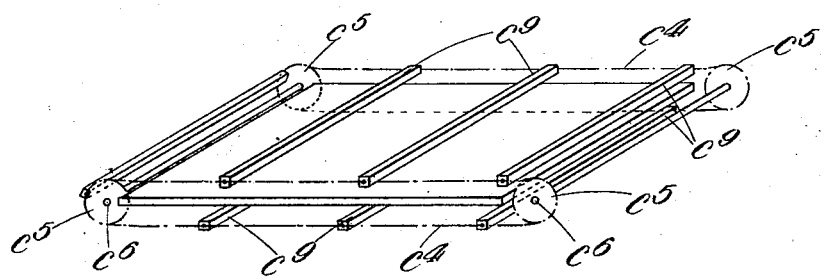
Figure 7 is a perspective view of the means for agitating the baffle detached.

The dust extractor comprises an outer casing C arranged above a series of retorts A constructed as described in the specification of U. S. Patent 1,541,071, before referred to, the casing having inlets $c^{11}$, $c^{11}$ and outlets $c^{13}$, $c^{13}$ for the hot gases or vapors.

Within the casing are a series of depending members each consisting of a plurality of horizontally disposed plates or slats $c$, $c$, which are slung from pivotal supports $c^1$, $c^1$, and are adapted to oscillate freely as rigid units about their pivotal supports.

Spaces or gas passages $c^2$, $c^2$, are provided between the horizontally disposed slats and the slats of each depending member are disposed in staggered relationship to those of the contiguous depending members, as shown in Figs. 4 and 5 so that the openings $c^2$ are out of horizontal alignment and the gases are caused to pursue a sinuous path in passing from one end of the apparatus to the other.

The spaced gas passages associated with the oscillatable members are disposed in irregular juxtaposition with respect to gas passages in the series of successive members.

Disposed beneath the slats is an endless band comprising chains $c^4$, $c^4$, supported by pinions $c^5$, $c^5$, mounted upon shafts $c^6$, $c^6$, the shafts being driven from any suitable source of power, as for example, by means of a shaft $c^7$, and driving pinion $c^8$.

Supported between the two chains $c^4$, $c^4$, are a series of horizontally disposed plates or cross-bars $c^9$, $c^9$, (see Figs. 5 and 6). The height of these plates is such that each plate $c^9$ extends above the horizontal plane of the chains $c^4$ and is thus adapted to strike the suspended slats $c$, $c$, so as to shake the same as the endless band travels, or, as shown at Figure 6, where a slightly different embodiment, hereinafter described, is illustrated, certain only of said upstanding members $c^9$ may be adapted to strike the suspended slats.

It will be observed that the transversely disposed plates or cross-bars $c^9$ also scrape the floor of the apparatus and serve to remove the dust deposited thereon as a result of the agitation produced by impact between the members $c^9$ and the lower ends of the depending members.

In other words, the upper portions of the members $c^9$ constitute means for imparting oscillatory motion to the dust-collecting plates $c$, $c$, while the lower portions of the members $c^9$ constitute means for removing deposited dust. In the specific embodiment illustrated in the drawing the means which accomplish these two separate functions are shown as integrated in the cross-bars $c^9$, but, obviously, it is not necessary that one and the same member be used in carrying out the separate functions of the two means. Thus, in dealing with the means for imparting oscillatory motion to the plates $c$, $c$, the lower portions of the elements $c^9$ are without function and can be disregarded, while in dealing with the means for removing deposited dust, the upper portions of the elements $c^9$ are without function and need not be considered, so that a structure in which alternate plates $c^9$ and no top extension and no bottom extension would function just as well as applicant's preferred structure, in which the two means are integrated.

In the modified arrangement shown at Figure 6 the dust collecting slats consist of vertical members slung from pivotal supports at the points $c^{10}$, $c^{10}$, a space being left between each suspended slat. The slats, as before, are disposed in staggered relationship to one another so that on the slats being struck by the upstanding members $c^9$ they enter and scrape the surface of the series of slats immediately in advance thereof, while at the same time they also serve to cause the gases to pursue a sinuous path in passing from end to end of the apparatus.

The gases from the retort enter the apparatus freely through inlet openings $c^{11}$, $c^{11}$, above the center of the lower set of retorts, and then pass in the manner indicated by the arrows at Figures 2 and 3 through the dust extractor; the gases, after having undergone treatment therein may pass through outlet openings $c^{13}$, $c^{13}$, leading to an impact condenser which may be of the kind described in my co-pending patent application No. 66,053, filed October 31st, 1925.

I claim:

1. Apparatus for removing dust from gases comprising a casing having inlet and outlet openings, a series of pivotally mounted and depending baffle members disposed within the casing, said depending members causing the gases to pursue a sinuous path in passing from the inlet to the outlet of the apparatus, each depending member being made up of a series of horizontally disposed slats arranged in spaced relationship with one another, and in staggered relationship with the slats of contiguous depending members, and a common means for agitating said depending members and removing the deposited dust from said casing.

2. Apparatus for removing dust from gases comprising a casing having inlet and outlet openings, a series of pivotally mounted and depending baffle members disposed within the casing, each depending member being made up of a series of horizontally disposed slats arranged in spaced relationship with one another and in staggered relationship with the slats of contiguous depending members whereby the gases will be caused to pursue a sinuous path in passing from the inlet to the outlet of the casing, endless chains travelling beneath said depending members, striker plates carried by the chains for agitating said depending members, said striker plates being also adapted to remove the deposited dust from said casing.

3. Apparatus for removing dust from hot gases comprising a casing having inlet and outlet openings, depending members within said casing the said depending members in one row being disposed in staggered relation to the members in contiguous rows whereby the gases are forced to take a sinuous path in travelling from the inlet to the outlet of the casing, and a common means for agitating said depending members and removing the deposited dust from said casing.

4. Apparatus for removing dust from hot gases comprising a casing having inlet and outlet openings, a series of pivotally mounted and depending baffle members disposed within the casing, comprising slots in staggered relation to those of adjacent members whereby the gases pursue a sinuous path in passing from the inlet to the outlet of the casing, endless chains travelling beneath said depending members, and means carried by said endless chains for moving the depending members about their pivotal supports so as to agitate them and shake off any dust deposited thereon.

5. Apparatus for removing dust from gases comprising a casing having an inlet and an outlet, a series of successive, pivotally mounted and depending rigid baffle members within the casing, each member being adapted to oscillate freely as a rigid unit about its pivotal mounting, said oscillatable members having slots disposed in irregular juxtaposition with respect to gas passages formed between the members of the series, whereby the gases are caused to pursue a sinuous path in passing from the inlet to the outlet, and means for oscillating the depending members about their pivotal supports so as to swing them and shake off dust deposited on the oscillating members.

6. Apparatus for removing dust from hot gases, comprising a casing having inlet and outlet openings therein, freely depending rigid members within said casing each comprising a plurality of slats in spaced relation to each other, the slats of one depending member being disposed in staggered relation to the slats in contiguous members, whereby the gases are caused to take a sinuous path in travelling from the inlet to the outlet of the said casing, endless chains travelling beneath said depending members, and means carried by said endless chains for moving the depending members about their pivotal supports so as to agitate them and shake off any dust deposited thereon.

7. Apparatus for removing dust from hot gases comprising a casing having inlet and outlet openings, a series of pivotally mounted and depending baffle members disposed within the casing, said baffle members having slots, with the slots in one member arranged in staggered relation to those in contiguous members whereby the gases pursue a sinuous path in passing from the inlet to the outlet of the casing, endless chains travelling within the casing, and striker plates carried by the endless chains for agitating said depending members, for the purpose described.

EDOARDO MICHELE SALERNI.